United States Patent
Ajichi et al.

(10) Patent No.: US 8,462,293 B2
(45) Date of Patent: Jun. 11, 2013

(54) ILLUMINATING DEVICE AND LIQUID CRYSTAL DISPLAY DEVICE

(75) Inventors: Yuhsaku Ajichi, Osaka (JP); Takeshi Masuda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/228,558

(22) Filed: Sep. 9, 2011

(65) Prior Publication Data

US 2012/0063162 A1    Mar. 15, 2012

Related U.S. Application Data

(63) Continuation of application No. 12/595,798, filed as application No. PCT/JP2008/063447 on Jul. 25, 2008, now Pat. No. 8,040,459.

(30) Foreign Application Priority Data

Jul. 27, 2007   (JP) .................................. 2007-196667

(51) Int. Cl.
    *G02F 1/1335* (2006.01)
(52) U.S. Cl.
    USPC ................... 349/62; 349/56; 349/61; 349/63; 349/64
(58) Field of Classification Search
    USPC .................................... 349/56, 61, 62, 63, 64
    See application file for complete search history.

(56) References Cited

U.S. PATENT DOCUMENTS

| | | | |
|---|---|---|---|
| 6,241,358 B1 | 6/2001 | Higuchi | |
| 6,414,761 B1 * | 7/2002 | Stepanek | 359/2 |
| 7,248,764 B2 | 7/2007 | Park et al. | |
| 7,275,851 B2 * | 10/2007 | Sakurai | 362/612 |
| 7,458,713 B2 | 12/2008 | Onishi | |
| 7,488,103 B2 | 2/2009 | Watanabe et al. | |
| 2002/0021563 A1 | 2/2002 | Ohsumi et al. | |
| 2002/0197051 A1 | 12/2002 | Tamura | |

(Continued)

FOREIGN PATENT DOCUMENTS

| | | |
|---|---|---|
| JP | 2001-093321 A | 4/2001 |
| JP | 2006-286638 | 10/2006 |
| JP | 2007-128788 | 5/2007 |
| WO | 2005/114273 A1 | 12/2005 |

OTHER PUBLICATIONS

International Search Report for PCT/JP2008/063447, mailed Sep. 9, 2008.

(Continued)

*Primary Examiner* — Jennifer Doan
(74) *Attorney, Agent, or Firm* — Nixon & Vanderhye P.C.

(57) ABSTRACT

A tandem type backlight comprises plural light-emitting units (11) including at least one point light source (5) and a light guide plate (7) for causing light from the at least one point light source to be diffused and surface-emitted. In each of the light-emitting units (11), a length X of a light guide area (9) is set so that an area, on a boundary surface between a light-emitting area (10) and the light guide area (9), of a cross-section of a light beam that is emitted from the at least one point light source (5) and is diffused in the light guide plate (7) is equal to or larger than an area of the boundary surface (interface). Moreover, a length X, in a length direction D1, of the light guide area is smaller than a length Y, in the length direction D1, of the light-emitting area.

5 Claims, 5 Drawing Sheets

U.S. PATENT DOCUMENTS

| | | |
|---|---|---|
| 2003/0076669 A1 | 4/2003 | Itoh |
| 2006/0221638 A1 | 10/2006 | Chew et al. |
| 2006/0245213 A1 | 11/2006 | Beil |
| 2007/0247869 A1* | 10/2007 | Lang et al. .................... 362/612 |
| 2009/0141001 A1* | 6/2009 | Kuroda et al. ................ 345/175 |
| 2009/0207339 A1* | 8/2009 | Ajichi et al. .................... 349/64 |
| 2010/0060818 A1* | 3/2010 | Ajichi et al. .................... 349/64 |

OTHER PUBLICATIONS

Supplementary EP Search Report mailed Mar. 23, 2011 in EP application 08791691.2.

Notice of Allowance mailed Jun. 17, 2011 in U.S. Appl. No. 12/595,798.

* cited by examiner

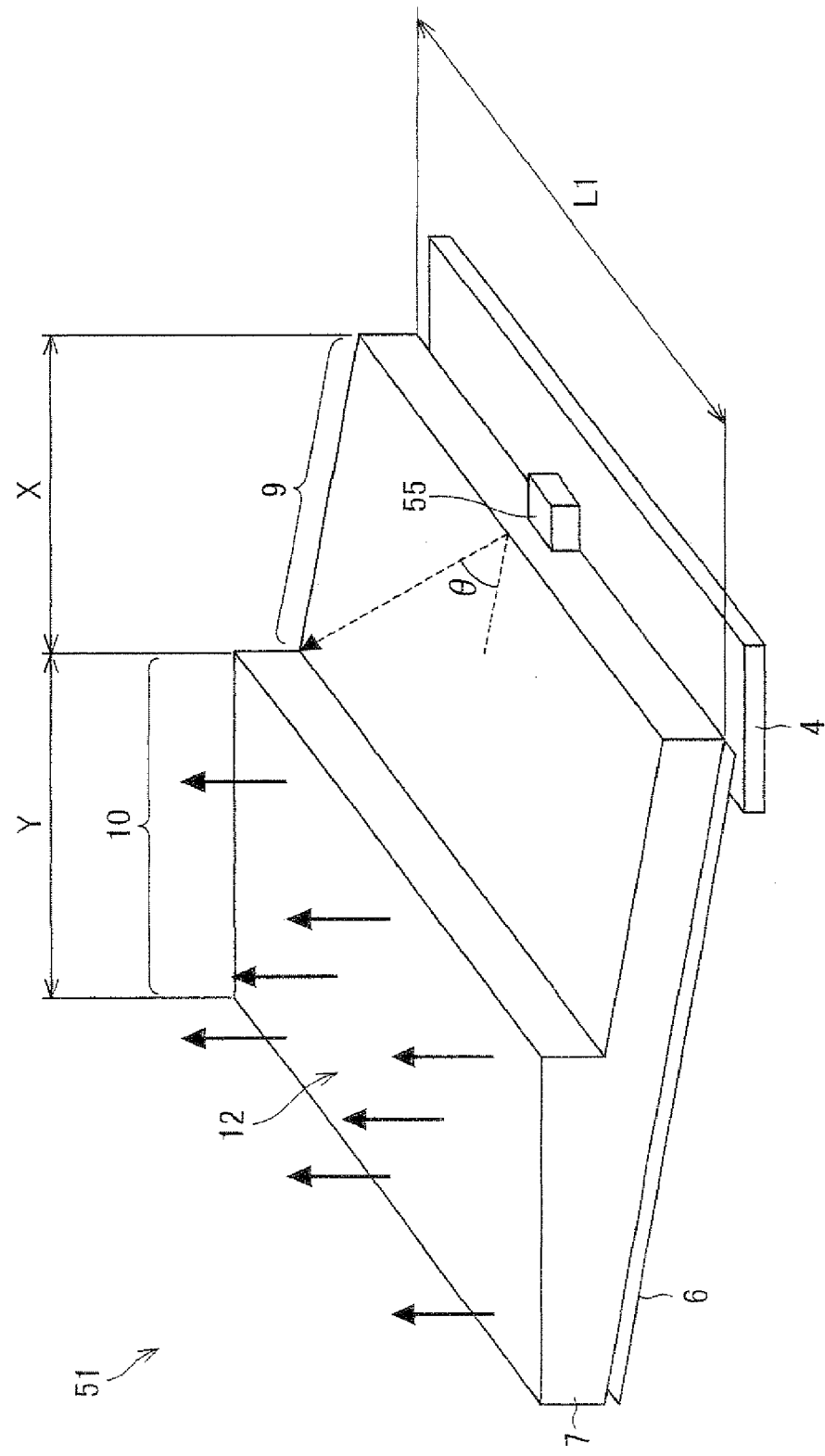
F I G. 5

ILLUMINATING DEVICE AND LIQUID CRYSTAL DISPLAY DEVICE

This application is a continuation of U.S. patent application Ser. No. 12/595,798, filed Oct. 13, 2009, now U.S. Pat. No. 8,040,459 which is the U.S. national phase of International Application No. PCT/JP2008/063447, filed 25 Jul. 2008, which designated the U.S. and claims priority to Japanese Patent Application No. 2007-196667, filed 27 Jul. 2007, the entire contents of each of which are hereby incorporated by reference.

TECHNICAL FIELD

The present invention relates to (i) an illuminating device used, for example, as a backlight of a liquid crystal display device and (ii) a liquid crystal display device including the illuminating device.

BACKGROUND ART

In recent years, liquid crystal display devices have rapidly become popular in replacement of cathode-ray tube (CRT) based display devices. Such liquid crystal display devices have been in widespread use in devices such as liquid crystal televisions, monitors, or portable phones, each of which takes advantage of features, of the liquid crystal display devices, such as low power consumption, small thickness, and light weight. One way to further take advantage of such features is to improve an illuminating device (so-called backlight) disposed behind a liquid crystal display device.

An illuminating device is largely classified into a side light type (also referred to as an edge light type) and a direct type. A side light type illuminating device is arranged such that a light guide plate is provided behind a liquid crystal display panel and that a light source is provided at a lateral edge of the light guide plate. Light emitted from the light source is reflected by the light guide plate so that the liquid crystal display panel is indirectly and uniformly irradiated by the light. With this arrangement, it is possible to realize an illuminating device which has a reduced thickness and high uniformity of brightness although the brightness is low. Accordingly, a side light type illuminating device has been mainly applied to medium-sized and small-sized liquid crystal display devices such as a portable phone and a laptop personal computer.

Examples of such a side light type illuminating device include a surface light-emitting device disclosed in Patent Literature 1. According to the surface light-emitting device, a reflection surface of a light guide plate is provided with a plurality of dots so that light can be uniformly emitted from a light-emitting surface. The surface light-emitting device is arranged such that a density of dots in corner parts of the reflection surface is made higher than the other parts. This is because light is not propagated to the corner parts due to a directional characteristic of each of light sources and the corner parts therefore become darkened.

A direct type illuminating device includes a plurality of light sources disposed behind a liquid crystal display panel so that the liquid crystal display panel is directly irradiated by light. With this arrangement, it is possible to easily achieve high brightness even in a case of a large-sized screen. Accordingly, such a direct type illuminating device has been mainly applied to a large-sized liquid crystal display device having a screen size of 20 inches or more. Unfortunately however, a currently available direct type illuminating device has a thickness of approximately 20 mm to 40 mm. This poses an impediment in realizing a further reduction in thickness of a display device.

A further reduction in thickness of a large-sized liquid crystal display device can be achieved by reducing a distance between the respective plurality of light sources and a liquid crystal display panel. Note however that it is impossible to obtain brightness uniformity of an illuminating device unless the number of light sources increases. However, an increase in the number of light sources causes an increase in cost. In view of this, there is a demand for development of an illuminating device which achieves a reduction in thickness and high uniformity of brightness without increasing the number of light sources.

Conventionally, in order to address the problems, attempts, in which a reduction in thickness of a large-sized liquid crystal display device is achieved, have been made by disposing a plurality of side light type illuminating devices.

For example, Patent Literature 2 discloses a surface light source device in which tandem-arranged plate-like light guide blocks are provided so as to partially overlap each other, and primary light sources each supplying primary light to a corresponding one of the plate-like light guide blocks. With this arrangement, it is possible to secure a large light-emitting area with a compact structure. Accordingly, such a surface light source device can be suitably applied to a large-sized liquid crystal display device.

Further, Patent Literature 3 discloses an illuminating device in which a plurality of polygonal light-emitting modules are aligned. Each of the plurality of polygonal light-emitting modules includes a light-emitting body, and a light source such as an LED that is disposed on an end part of the light-emitting body.

Such an illuminating device in which a plurality of light-emitting units, each of which is constituted by a combination of a light source and a light guide plate, are disposed is called a tandem type-illuminating device.

CITATION LIST

Patent Literature 1
Japanese Patent Application Publication, Tokukai, No. 2003-43266 A (Publication Date: Feb. 13, 2003)
Patent Literature 2
Japanese Patent Application Publication, Tokukaihei, No. 11-288611 A (Publication Date: Oct. 19, 1999)
Patent Literature 3
Japanese Patent Application Publication, Tokuhyou, No. 2006-522436 A (Translation of PCT Application) (Publication Date: Sep. 28, 2006)
Patent Literature 4
Japanese Patent Application Publication, Tokukai, No. 2003-132722 A (Publication Date: May 9, 2003)

SUMMARY OF INVENTION

By the way, in a case where a point light source such as a light-emitting diode (LED) is used as a light source in an illuminating device constituted by a combination of a light guide plate and the light source, it is desirable that a light guide section, for sufficiently diffusing light emitted from the light source and for guiding the light to a light-emitting surface, is provided so that the light can be more uniformly emitted from an entire light-emitting surface of the light guide plate.

For example, in the illuminating device disclosed in Patent Literature 3, a light input coupling section (3) serves as such a light guide section (see, for example, FIG. 4 of Patent Literature 3). Specifically, light emitted from an LED light source (2) is diffused while traveling in the light input coupling section (3), and is then emitted from a light-emitting surface (6) of a light-emitting body (9).

However, a conventional illuminating device, which is constituted by a combination of a point light source and a light guide plate and which has such a light guide section, does not consider a length of the light guide section provided between the light source and a light-emitting surface. Therefore, there still is a problem that light is not uniformly emitted from the light-emitting surface.

Specifically, in a case where a distance, from a light source to a boundary between a light guide section and a light-emitting section (i.e., a length of the light guide section in a direction pointing from the light source to the light-emitting section), is short in an illuminating device configured as above, the problem occurs that light emitted from the light source undesirably reaches the light-emitting section before being sufficiently diffused by the light guide section (before reaching both ends of the light guide plate). This is because the light, traveling from air which exists outside the light guide plate in which a point light source is provided into the light guide plate, has a refraction angle of smaller than a critical angle based on the Snell's law. A light beam entering the light guide plate at a certain critical angle is radially diffused in the light guide section while traveling in the light guide section, but undesirably reaches the light-emitting section before reaching both sides of the light guide plate.

In a case where light emitted from a light source is emitted from a light-emitting section before it is not sufficiently diffused, dark parts which the light does not reach are formed on a light-emitting surface of a light guide plate. This causes the light not to be uniformly emitted from the light-emitting surface. A display device employing, as a backlight, such an illuminating device causes a deterioration in displaying quality.

Meanwhile, as for a tandem type-illuminating device, in a case where a length of a light guide section in a direction pointing from a light source to a light-emitting section is made too long, two or more light guide sections overlap each other under one light-emitting section. This causes three or more light guide plates to be stacked. A plurality of stacked light guide plates cause an increase in thickness of the illuminating device. Consequently, it becomes impossible to achieve a reduction in thickness of a display.

The present invention was attained in view of the above problems. An object of the present invention is to provide an illuminating device in which a distance from a light source to a boundary between a light guide section and a light-emitting section is specified so that (i) light from the light source can be uniformly emitted, and (ii) an increase in thickness of the illuminating device can be suppressed.

In order to attain the above object, an illuminating device of the present invention includes a plurality of combinations each including: at least one point light source, and a light guide plate for causing light from the at least one point light source to be diffused and surface-emitted, the light guide plate including (i) a light-emitting section having a light-emitting surface and (ii) a light guide section for guiding the light from the at least one point light source to the light-emitting section, a light-emitting section of one of any adjacent two light guide plates in the plurality of combinations being provided above a light guide section of the other of the any adjacent two light guide plates in the plurality of combinations, a length of the light guide section provided between the at least one point light source and the light-emitting section being set so that an area, on a boundary surface between the light-emitting section and the light guide section, of a cross-section of a light beam that is emitted from the at least one point light source and is diffused in the light guide plate is equal to or larger than an area of the boundary surface, and a following expression (1) being satisfied $$X < Y \qquad (1)$$

where Y is a length of the light-emitting section in a length direction, and X is a length of the light guide section in the length direction, the length direction being a direction pointing from the at least one point light source toward the light-emitting section.

According to the arrangement, a length of a light guide section provided between a light source and a light-emitting section (i.e. a length of the light guide section in a direction pointing from the light source to the light-emitting section) is specified as above. This makes it possible to prevent light, which entered from the point light source to a light guide plate at an angle falling within a certain critical angle, from reaching to the light-emitting section before it is spread out to both ends of the light guide plate. Since it is possible to prevent light from the light source from reaching the light-emitting section before it is sufficiently spread out, it is possible to prevent unevenness in brightness which occurs due to the fact that there exist, in the light-emitting surface of the light guide plate, (i) bright parts where the light has reached and (ii) dark parts where the light did not reach. Consequently, it is possible to realize an illuminating device in which light from a light source can be more uniformly emitted.

Further, according to the arrangement, a length, in the length direction, of the light guide section is smaller than a length, in the length direction, of the light-emitting section. This makes it possible to prevent three of a plurality of light guide plates from being stacked, in a case where the plurality of light guide plates are disposed so that a light-emitting section of one of any adjacent two of the plurality of light guide plates is provided above a light guide section of the other of the any adjacent two of the plurality of light guide plates. This can prevent an increase in thickness of the illuminating device.

In the illuminating device of the present invention, it is preferable that the plurality of combinations each of which includes a single point light source, and in a case where the single point light source is provided in a central area of a length L1 of the light guide plate, the length X in the length direction of the light guide section which is provided between the single point light source and the light-emitting section satisfies a following expression (2)

$$X \geq \frac{L1 + n\sqrt{\{1 - (1/n^2)\}}}{2} \qquad (2)$$

where n is a refractive index of the light guide plate, and L1 is a length in a width direction of the light guide plate, the width direction intersecting with the length direction.

In order to cause light traveling from the light source to the light guide plate to reach whole of the boundary surface (interface) between the light-emitting section and the light guide section, it is only necessary that light entered from the light source to the light guide plate at a critical angle A reach both ends, in the width direction, of the light guide plate in the light guide section.

According to the arrangement, the length X becomes minimum when light that entered from the light source to the light guide plate at a critical angle θ is spread out to both ends, in the width direction, of the light guide plate on the boundary surface (interface) between the light-emitting section and the light guide section. This makes it possible to spread out light, which entered from the light source to the light guide plate, to whole of the boundary surface (interface) between the light-emitting section and the light guide section. Note that the critical angle varies depending on a refractive index of a material of which the light guide plate is made.

In the illuminating device of the present invention, it is preferable that the plurality of combinations each of which includes a plurality of point light sources which emit light of different colors and which are disposed in a width direction intersecting with the length direction, and in a case where the plurality of point light sources are provided in a central area of a length L1 of the light guide plate, the length X in the length direction of the light guide section provided between the plurality of point light sources and the light-emitting section satisfies a following expression (3)

$$X \geq \frac{(L1 + L2)n\sqrt{1 - (1/n^2)}}{2} \quad (3)$$

where n is a refractive index of the light guide plate, L2 is a distance between a point light source at one end and a point light source at the other end in an arrangement direction of the plurality of point light sources, and L1 is a length in the width direction of the light guide plate.

According to the arrangement, the length X becomes minimum when light, that is emitted from a light source disposed farthest from one end of the light guide plate and that entered the light guide plate at a critical angle, reaches the one end of the light guide plate. This makes it possible to spread out light, which entered from each of the light sources to a corresponding light guide plate, to whole of a boundary surface (interface) between a light-emitting section and a light guide section. Note that the critical angle varies depending on a refractive index of a material of which the light guide plate is made.

According to the arrangement, in a case where each of the light sources is constituted by light-emitting diodes each having one of plural kinds of different colors (e.g. red (R), green (G), blue (B)), it is possible to prevent light from each of the light sources from reaching a light-emitting section before the colors of light from the light sources are not uniformly mixed. This makes it possible to realize a state in which light having the respective colors are uniformly mixed to the whole of the boundary surface between the light-emitting section and the light guide section.

Therefore, according to the arrangement, in a case where light sources are light-emitting diodes each having one plural kinds of different colors, it is possible to cause a light-emitting surface of the light guide plate to emit more uniform light.

Patent Literature 4 discloses a surface light source device including a prism between LEDs and a light guide plate in order to suppress chromaticity unevenness which can be caused in a case where LEDs each having one of different colors are combined. However, the arrangement in which the prism is provided causes a reduction in an area in which a light source and the light guide plate make contact with each other. This causes a reduction in use efficiency of light from the LED serving as the light source. Moreover, in a case where this illuminating device has a tandem arrangement, a prism needs to be provided for each light guide plate, and in a case where the light guide plates are formed by a method such as injection molding, a mold cost becomes high. This undesirably causes an increase in manufacturing cost. In contrast, according to the arrangement of the present invention, it is possible to suppress brightness unevenness and chromaticity unevenness without adding a new member.

In the illuminating device of the present invention, it is preferable that the point light source(s) is a light-emitting diode.

According to the arrangement, it is possible to realize a reduction in size and thickness of the illuminating device.

A liquid crystal display device of the present invention includes, as a backlight, any one of the illuminating devices.

Since the liquid crystal display device of the present invention includes, as a backlight, the illuminating device of the present invention, it is possible to cause a liquid crystal display panel to be irradiated by more uniform light. This allows an improvement in displaying quality.

For a fuller understanding of the nature and advantages of the invention, reference should be made to the ensuing detailed description taken in conjunction with the accompanying drawings.

BRIEF DESCRIPTION OF DRAWINGS

FIG. 5 is a perspective view showing another configuration example of a light-emitting unit constituting a backlight provided in a liquid crystal display device of the present invention.

| Reference Signs List | |
|---|---|
| 1: | Liquid crystal display device |
| 2: | Backlight |
| 3: | Liquid crystal display panel |
| 5: | Light source, LED (point light source) |
| 6: | Reflection sheet |
| 7: | Light guide plate |
| 7a: | Light guide plate |
| 7b: | Light guide plate |
| 9: | Light guide area (light guide section) |
| 10: | Light-emitting area (light-emitting section) |
| 11: | Light-emitting unit |
| 12: | Light-emitting surface |
| 51: | Light-emitting unit |
| 55: | Light source, LED (point light source) |
| D1: | Length direction |
| D2: | Width direction |
| n: | Refractive index of light guide plate |
| θ: | Critical angle |

DESCRIPTION OF EMBODIMENTS

One embodiment of the present invention is described below with reference to the attached drawings. Note, however, that the size, material, shape, and relative arrangement of components described in this embodiment are not intended to limit the scope of the present invention only to these unless otherwise specified, but are merely illustrative.

Figure 2:
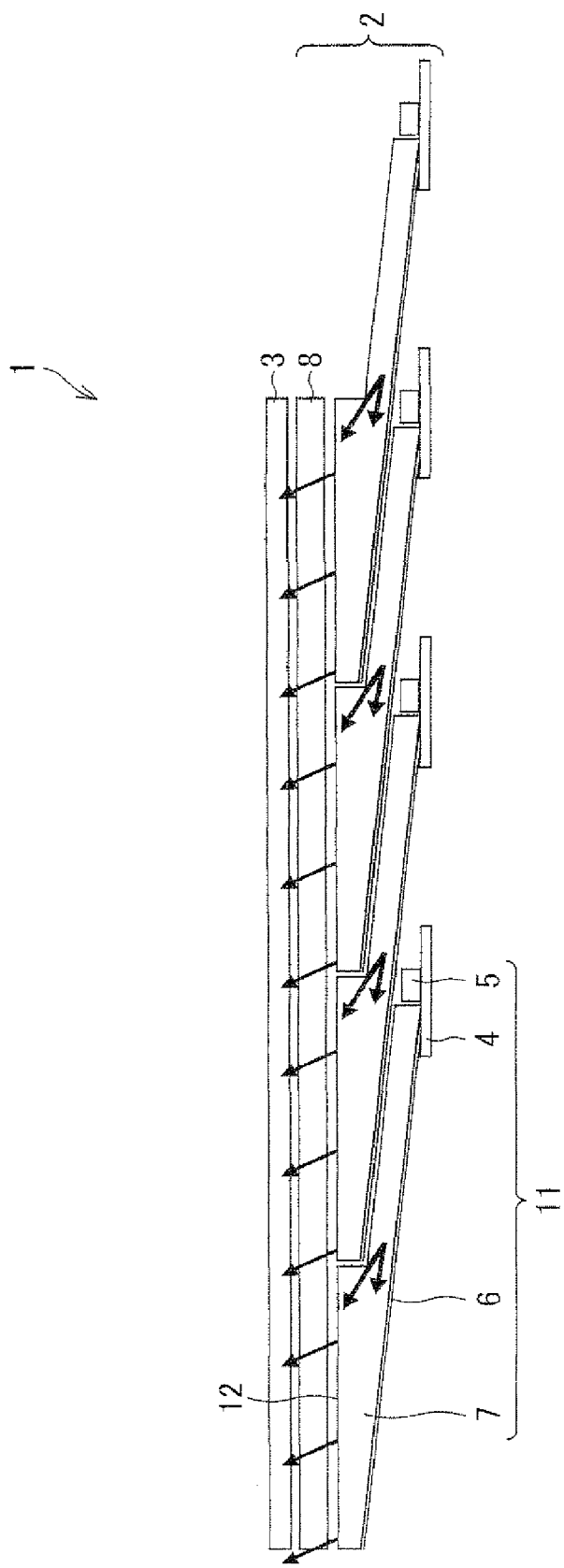
FIG. 2 is a cross-sectional view showing an arrangement of a liquid crystal display device of an embodiment of the present invention.

The present embodiment deals with a tandem type-illuminating device including a plurality of light-emitting units each constituted by a combination of a point light source and a light guide plate. FIG. 2 shows an arrangement of a liquid crystal display device 1 including a tandem type-illuminating device serving as a backlight.

As shown in FIG. 2, the liquid crystal display device 1 of the present embodiment includes a liquid crystal display panel 3 and a backlight 2 (illuminating device) disposed behind the liquid crystal display panel 3. The backlight 2 projects light toward the liquid crystal display panel 3. The liquid crystal display device 1 is a transmissive liquid crystal display device which displays an image by causing the liquid crystal display panel 3 to transmit light emitted from the backlight 2.

In the present invention, the liquid crystal display panel 3 is not limited to a specific arrangement, and therefore can be a known liquid crystal panel. For example, the liquid crystal display panel 3 includes an active matrix substrate on which a plurality of TFTs (thin film transistors) are provided, a color filter substrate provided so as to face the active matrix substrate, and a liquid crystal layer, sealed with a sealing material, between these substrates (not shown).

The following description deals with an arrangement of the backlight 2 provided in the liquid crystal display device 1.

As shown in FIG. 2, the backlight 2 is disposed behind the liquid crystal display panel 3 (on a side opposite to a side where a display surface exists), and includes a plurality of light-emitting units 11, each of which is constituted by a combination of a light source 5 and a light guide plate 7.

Figure 1:
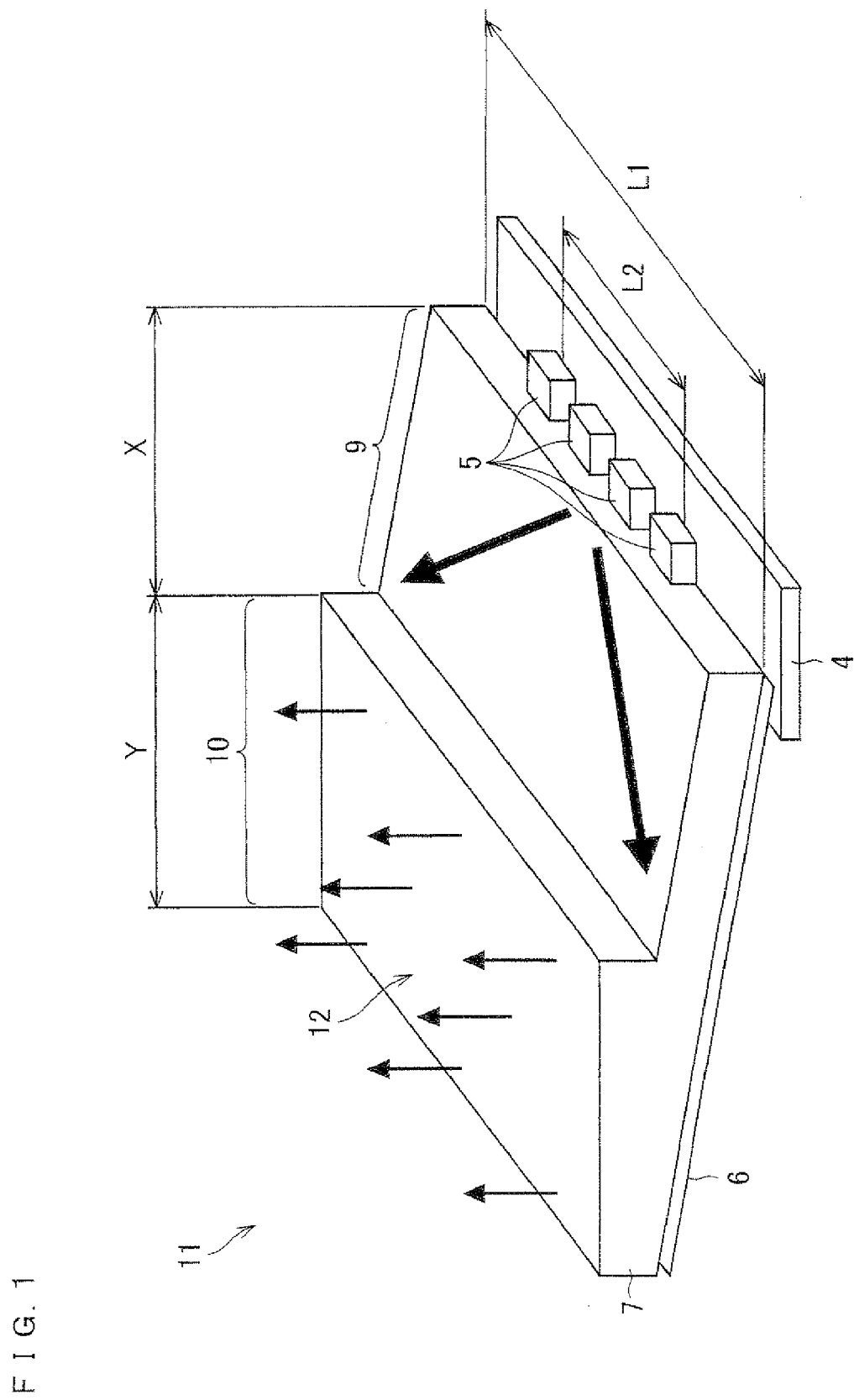
FIG. 1 is a perspective view showing an arrangement of a light-emitting unit which constitutes a backlight provided in a liquid crystal display device shown in FIG. 2.

Here, an arrangement of each of the light-emitting units 11 is described in more detail with reference to FIG. 1. Each of the light-emitting units 11 includes components such as light sources 5, a light guide plate 7 for causing light from the light sources 5 to be diffused and surface-emitted (emitted in a form of plane emission), a substrate 4 on which the light sources 5 are provided, and a reflecting sheet 6.

Each of the light sources 5 is a point light source such as a light-emitting diode (LED). In the present embodiment, the light sources 5 are respective light-emitting diodes each having one of plural kinds of different colors. Specifically, the light sources 5 constitute an LED group in which a plurality of light-emitting diodes each having one of three colors (red (R), green (G), blue (B)) are aligned. Since the light sources 5 are constituted by a combination of the plurality of light-emitting diodes each having one of the three colors, it is possible to cause white light to be emitted from a light-emitting surface.

A combination of colors of the plurality of light-emitting diodes can be appropriately determined based on (i) color properties of the respective light-emitting diodes having respective colors and (ii) a color property of a target backlight which is requested in accordance with a purpose for which the liquid crystal display device 1 is used. The light sources 5 constituting the LED group is provided on the substrate 4. The light sources 5 can be a side light emission type LED in which LED chips of R, G, and B are molded so as to constitute a single package. As such, it is possible to obtain a backlight having a wide color reproduction range.

The light guide plate 7 causes light emitted from the light source 5 to be surface-emitted from a light-emitting surface (also referred to as "light exit plane") 12. The light-emitting surface 12 is a surface from which the light is projected toward the liquid crystal display panel 3 which is an object to be illuminated.

In the present embodiment, the light guide plate 7 is constituted by (i) a light-emitting area 10 (light-emitting section) having the light-emitting surface 12 and (ii) a light guide area 9 (light guide section) for guiding light from the light source 5 toward the light-emitting area 10. The light source 5 is disposed along an edge of the light guide area 9 which is farthest from the light-emitting area 10. As shown in FIG. 1, the light-emitting area 10 has a thickness larger than the light guide area 9, so that a step is formed between the light guide area 9 and the light-emitting area 10. The thickness of the light-emitting area 10 becomes smaller as a distance becomes farther from the light source 5.

A top surface and/or a rear surface of the light-emitting area 10 of the light guide plate 7 are(is) subjected to a process and/or a treatment causing guided light to be emitted from a top surface of the light-emitting area 10. This allows light from the light-emitting surface 12 to be more efficiently emitted toward the liquid crystal display panel 3. Examples of such a process and/or a treatment to which the surface (light-emitting surface 12) of the light-emitting area 10 of the light guide plate 7 is subjected includes prism treatment, texturing, and printing treatment. However, the process and/or the treatment are(is) not particularly limited, and can be any known treatment for causing light to be emitted from a light-emitting surface.

The light guide plate 7 can be made of a transparent resin such as polycarbonate (PC) or polymethylmethacrylate (PMMA). A material of which the light guide plate 7 is made is not limited to these, but can be any material generally used as a light guide plate. The light guide plate 7 can be formed by a method such as injection molding, extrusion molding, heat-press molding, or cutting. However, a method for forming the light guide plate 7 is not limited to these, but can be any method, provided that a treatment method causing the light guide plate 7 to have similar properties can be used.

The substrate 4 on which the light sources 5 are provided preferably is white so that brightness can be improved. The substrate 4 has a rear surface (i.e., a surface opposite to a surface on which the light source 5 is mounted) that is provided with drivers (not shown) for controlling lighting of the respective LEDs constituting the respective light sources 5. That is, the drivers are mounted on the same substrate 4 on which the LEDs are provided. This at least allows a reduction in the number of substrates and a reduction in the number of connectors connecting the substrates, thereby ultimately allowing a reduction in production cost for the liquid crystal display device 1. Moreover, such a reduction in the number of substrates allows a reduction in thickness of the backlight 2.

The reflecting sheet 6 has an end part sandwiched between an end part of the substrate 4 and an end part of the light guide plate 7, and is provided so as to be in contact with a rear surface of the light guide plate 7 (a surface which is opposite to the light emitting surface 12). The reflecting sheet 6 reflects light so that light can be effectively emitted from the light-emitting surface 12.

The backlight 2 of the present embodiment includes a plurality of light-emitting units 11 arranged as above. As shown in FIGS. 1 and 2, the backlight 2 is arranged such that (i) each of the light-emitting areas 10 of the plurality of light-emitting units 11 has a thickness larger than a corresponding light guide area 9, and (ii) a light-emitting area 10 of one of any adjacent two of the plurality of light-emitting units 11 is provided above a light guide area 9 of the other of the any adjacent two of the plurality of light-emitting units 11. The backlight 2 in which the plurality of light-emitting units 11 are disposed as above is referred to as a tandem-structure backlight.

Figure 3:
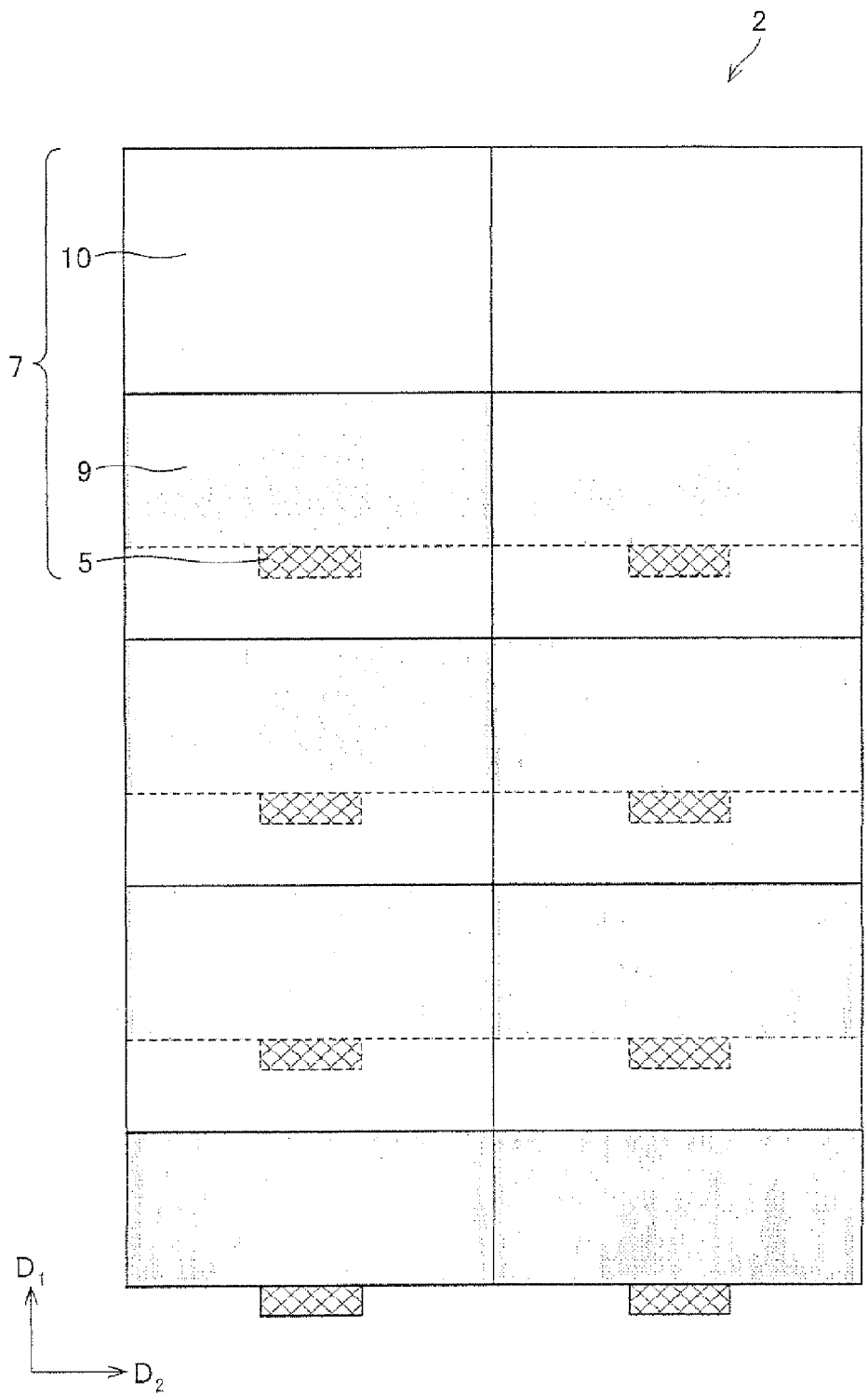
FIG. 3 is a plan view showing an arrangement of a backlight provided in the liquid crystal display device shown in FIG. 2.

FIG. 3 is a plan view showing an example of how the plurality of light-emitting units 11 are disposed. A backlight 2 shown in FIG. 3 is constituted by eight light-emitting units 11. According to the backlight 2, (i) a first group of four light-emitting units 11 is disposed so that a light-emitting area 10 of one of any adjacent two of the four light-emitting units 11 is provided above a light guide area 9 (shaded in FIG. 3) of the other of the any adjacent two of the four light-emitting units 11, and (ii) a second group of four light-emitting units 11 disposed in a similar manner is provided next to the first group. This causes the eight light-emitting areas 10 to form a single flat light-emitting surface. Note that, in this specification, a direction in which a light-emitting area of one of any adjacent two of the plurality of light-emitting units is provided above a light guide area of the other of the any adjacent two of the plurality of light-emitting units is referred to as a length direction D1, and a direction which intersects with the length direction D1 (a direction substantially perpendicular to the length direction D1) is referred to as a width direction D2. In other words, a direction pointing from a light source 5 to a light emitting area 10 in each of the plurality of light-emitting units 11 is the length direction D1.

The backlight 2 includes an optical sheet 8 disposed above the plurality of light-emitting units 11 having the tandem arrangement as above. The optical sheet 8 is constituted by (i) a diffusion plate for causing the liquid crystal display panel 3 to be irradiated by uniform light, (ii) a diffusion sheet for converging and diffusing light, (iii) a lens sheet for converging light so as to improve brightness in a front direction, and (iv) a polarizing and reflecting sheet from which one of polarized components of light is reflected and which the other of the polarized components of the light transmits so as to improve brightness of the liquid crystal display device 1, alone or in combination. An arrangement of the optical sheet 8 can be determined according to price and/or performance of the liquid crystal display device 1.

With the above arrangement, light emitted from each of the point light sources 5 travels through a corresponding light guide plate 7 while it is being subjected to diffusion and reflection, and is ultimately emitted from a corresponding light-emitting surface 12. In FIGS. 1 and 2, each of the arrows indicates a direction in which the light travels.

The light emitted from the light-emitting surface 12 is then diffused, by the optical sheet 8 disposed above the light guide plate 7, so as to be made uniform and converged onto the liquid crystal display panel 3.

In a case where point light sources 5 and a light guide plate 7 are combined as in the backlight 2 of the present embodiment, light beams emitted from the respective light sources 5 are radially diffused, at a critical angle θ, in a corresponding light guide plate 7.

The term "critical angle θ" used herein refers to the maximum refraction angle at which light can travel from air having lower refractive index to a light guide plate having higher refractive index (an angle inclined with respect to a normal line to a boundary surface between air and the light guide plate).

For example, since a light guide plate has a refractive index n2 larger than a refractive index n1 of air (n1<n2), light entering from air to the light guide plate is refracted in a direction closer to a normal line than to an angle of the light entered with respect to the normal line (entry angle). The critical angle θ is a refraction angle obtained when the entry angle becomes maximum, i.e., 90°.

That is, according to the present embodiment, the light beams entered from the respective light sources 5, which are provided in air, toward the corresponding light guide plate 7 is radially diffused, at a critical angle θ, in the light guide plate 7. Note that the critical angle θ, which is on the light guide plate 7 side of a boundary surface between the air and the light guide plate 7, is determined by the Snell's law based on a refractive index n which varies depending on a material of which the light guide plate 7 is made.

A light guide area 9 of the light guide plate 7 serves to sufficiently spread out the light beams, which entered the light guide plate 7 at the critical angle θ, before the light beams reach a corresponding light-emitting area 10.

However, according to a conventional backlight, a length of a light guide area 9 (a length X of the light guide area 9 in the direction D1 pointing from a light source 5 to a light-emitting area 10) is not specified. Therefore, in a case where the length of the light guide area 9 is shorter than a predetermined one, light which entered a corresponding light guide plate 7 at a critical angle θ reaches the light-emitting area 10 before it fully spreads out to both sides of the light guide plate 7 in the light guide area 9. This undesirably causes formation of dark parts, where no light reaches, in both end parts, in the width direction D2, of the light guide plate 7. This causes a problem that non-uniform light emission is achieved. A display device using such an illuminating device as a backlight causes a deterioration in displaying quality.

Especially in a case where, as in a backlight 2 of the present embodiment, a backlight is arranged in each of a plurality of light-emitting units 11 so that light sources 5 constitute an LED group in which a plurality of light-emitting diodes each having one of three colors (red (R), green (G), blue (B)) are aligned, then a light guide area 9 also serves as a color mixing area in which the three colors are mixed so that white light can be emitted from a light-emitting surface 12. In a case where the light guide area (color mixing area) has a small length in such a backlight 2, the colors are not completely mixed, and separated red light, separated green light, and separated blue light are emitted from the light-emitting surface 12 of the light-emitting area 10. This causes unevenness in brightness.

In view of this, according to the present invention, a length X of a light guide area 9 provided between a light source 5 and a light-emitting area 10 is set so that an area, on a boundary surface (interface) between the light-emitting area 10 and the light guide area 9, of a cross-section of a light beam that is emitted from the light source 5 and is diffused in a light guide plate 7 is equal to or larger than an area of the boundary surface.

In a case where the length X of the light guide area 9 is specified as above, then it is possible to prevent light, which entered from the point light source 5 to the light guide plate 7 at a certain critical angle θ, from reaching a light-emitting section before it radially spreads out to both ends of the light guide plate 7. This can prevent unevenness in brightness which occurs due to the fact that there exist, in the light-emitting surface 12 of the light guide plate 7, (i) bright parts where the light has reached and (ii) dark parts where the light did not reach.

Moreover, according to the present invention, the length X of the light guide area 9 and a length Y of the light-emitting area 10 satisfy the following expression (1) (see FIG. 1), where Y is a length of the light-emitting area 10 in the length direction of the light-emitting area 10 in the light guide plate 7.

$$X<Y \tag{1}$$

That is, in each of the light guide plates 7, the length X of a light guide area 9 is smaller than the length Y of a corresponding light-emitting area 10. With the arrangement, it is possible to prevent three of a plurality of light guide plates arranged in tandem from being stacked. This makes it possible to suppress an increase in thickness of an illuminating device.

Figure 4:
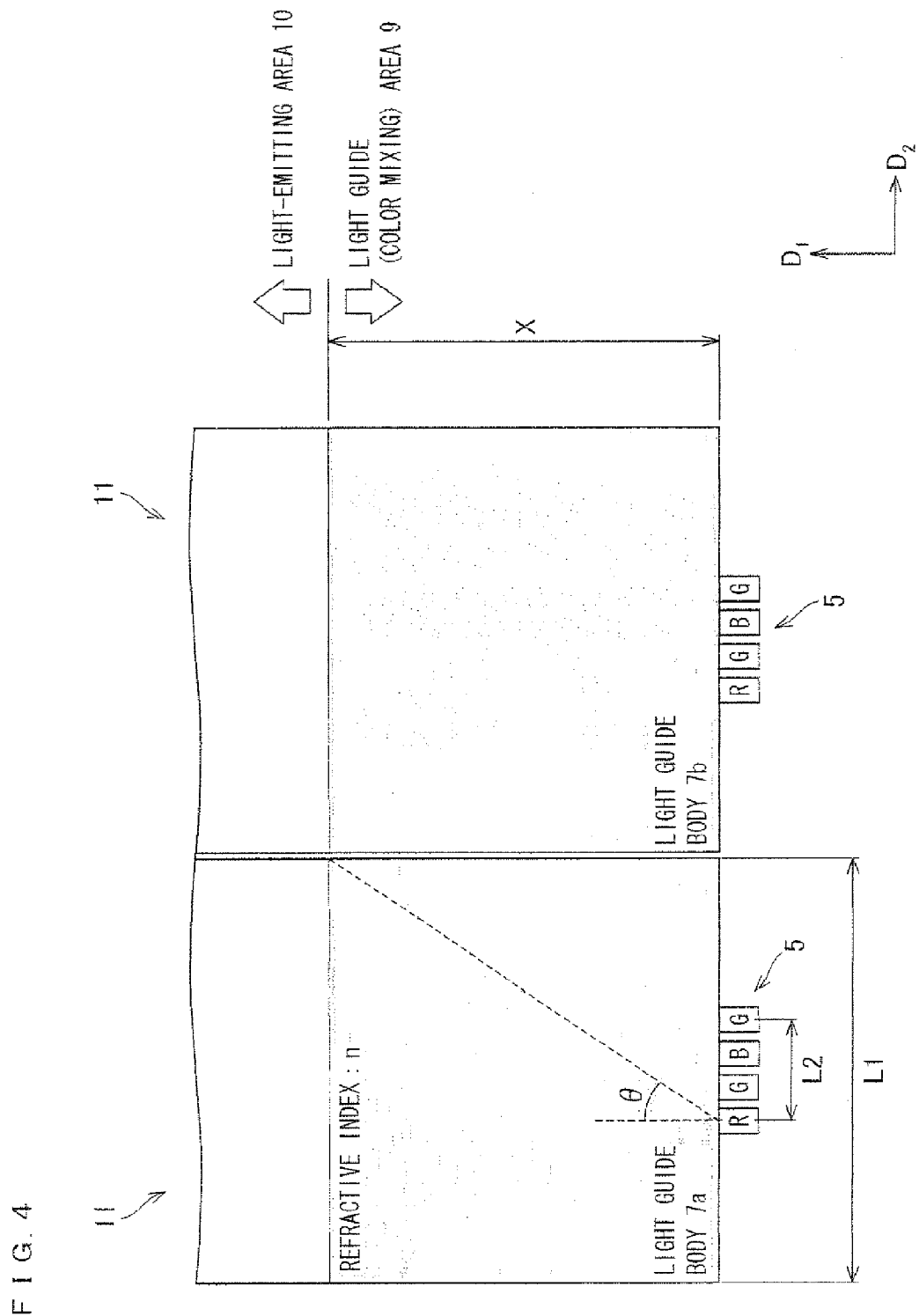
FIG. 4 is a schematic view for explaining how a length of a light guide area and a length of a light emitting-area are specified in a light guide plate shown in FIG. 1.

The following description deals with how to set the length X of a light guide area 9 with reference to FIG. 4. FIG. 4 shows a preferable length X of the light guide area 9, and FIG. 4 is a plan view schematically illustrating two light guide plates 7a and 7b and light sources 5 constituted by respective LED groups.

FIG. 4 shows two light guide plates 7a and 7b disposed, in the backlight 2, in the width direction D2. In this example, each of the light sources 5 is constituted by an LED group in which a red LED (R-LED), a green LED (G-LED), a blue LED (B-LED), and another green LED (G-LED) are disposed in the width direction D2 in this order along an edge of a corresponding one of the light guide plates 7a and 7b. Each of the light guide plates 7a and 7b includes a single light source 5 constituted by such an LED group.

In each of the LED groups constituting a corresponding light source 5, a distance between an LED at one end and an LED at the other end (a distance between the R-LED and the G-LED in FIG. 4) is expressed as L2, a length, in the width direction D2, of a light guide plate 7 (7a and 7b) is expressed as L1, and a refractive index of the light guide plate 7 is expressed as n. As is early described, the light that entered from air, in which the light source 5 is provided, to the light guide plate 7 are refracted at an angle falling within a critical angle θ based on the Snell's law.

In order to cause the light entered from the light source 5 to the light guide plate 7 to reach whole of the boundary surface between the light-emitting area 10 and the light guide area 9, it is only necessary that the light entered, at a critical angle θ, from the light source 5 to the light guide plate 7 reach both ends, in the width direction D2, of the light guide plate 7 in the light guide area 7.

The length X satisfying such a condition becomes minimum when light, that is emitted from an LED disposed farthest from one end of the light guide plate 7 and that enters the light guide plate 7 at a critical angle θ, reaches the one end of the light guide plate 7. That is, in FIG. 4, the length X becomes minimum when light, that is emitted from the leftmost LED (i.e. R-LED) and that enters the light guide plate 7 at a critical angle θ, reaches an end of the light guide plate 7 on the boundary surface between the light-emitting area 10 and the light guide area 9 (see the broken line in FIG. 4).

The minimum value of the length X satisfies the following equation (a).

$$\mathrm{Tan}\,\theta = \{(L1+L2)/2\}/X = (L1+L2)/2X \quad (a)$$

Here, the following equation (b) can be obtained from the Snell's law.

$$\mathrm{Sin}\,\theta = 1/n \quad (b)$$

Further, the following equation (c) can be obtained from a formula of a trigonometric function.

$$\tan\theta = \frac{\sin\theta}{\sqrt{(1-\sin^2\theta)}} \quad (c)$$

The minimum value of X satisfies the following equation (d) which is obtained from the equations (a) through (c).

$$(L1+L2)/2X = \frac{1}{n\sqrt{\{1-(1/n^2)\}}} \quad (d)$$

$$X = \frac{(L1+L2)n\sqrt{\{1-(1/n^2)\}}}{2}$$

Therefore, the length X preferably satisfies the following expression (3)

$$X \geq \frac{(L1+L2)n\sqrt{\{1-(1/n^2)\}}}{2} \quad (3)$$

Note that, in a case where the length X satisfies the expression (3), a light source 5 is disposed in a central area of the length L1, in the width direction D2, of a light guide plate 7. With the arrangement, it is possible to make the length X of the light guide area 7 shorter, as compared to a case where the light source 5 is disposed off the center of the length L1 in the width direction D2.

As described above, a preferable range of the length X of the light guide area 9 is specified by the expression (3), based on the fact that the light that entered from air, in which the light source 5 is provided, to the light guide plate 7 are refracted at an angle falling within a critical angle θ based on the Snell's law. Note that the critical angle θ varies depending on a refractive index n of a material of which the light guide plate 7 is made.

For example, in a case where the light guide plate 7 is made of polycarbonate, the refractive index n is 1.59, and the critical angle θ is 38°. In a case where the light guide plate 7 is made of PMMA (polymethylmethacrylate), the refractive index is 1.49, and the critical angle θ is 42°.

The following description deals with examples of concrete ranges of the length X of the light guide area 9.

For example, the length X becomes 16.6 mm or more, in a case where (i) a light guide plate 7 is made of polycarbonate, (ii) the length L1, in the width direction D2, of the light guide plate 7 is 24 mm, and (iii) the length L2 between an LED at one end and an LED at the other end in the LED group constituting the light source 5 is 3 mm. Meanwhile, a maximum of the length X should be as follows. Specifically, the length X should be less than 27 mm in a case where the length Y of the light-emitting area 10 is 27 mm. In view of these dimensions, the length X of the light guide area 9 can be, for example, set to 25 mm in the light-emitting unit 11.

According to a backlight 2 constituted by a combination of the light-emitting units 11 arranged as above, it is possible to spread out light, which entered, at a critical angle, from each of the light sources to a corresponding one of light guide plates, to the whole of a boundary surface between a corresponding light-emitting section and a corresponding light guide section. Further, in a case where each of the light sources is constituted by light-emitting diodes each having one of plural kinds of different colors, it is possible to prevent light from each of the light sources from reaching a light-emitting section before the colors of light from the light sources are not uniformly mixed. This makes it possible to realize a state in which light having the respective colors are uniformly mixed to the whole of a boundary surface between the light-emitting section and a corresponding light guide section.

Further, according to the arrangement, a length X of a light guide area 9 is smaller than a length Y of a corresponding light-emitting area 10. With the arrangement, it is possible to prevent three of a plurality of light guide plates arranged in tandem from stacking. This makes it possible to suppress an increase in thickness of an illuminating device.

The following description deals with, as another configuration example, a case where a single LED serving as a light source is provided for each of light guide plates. FIG. 5 shows a structure of a light-emitting unit 51 in which a single LED serving as a light source is provided for each of the light guide plates. Note that, in the light-emitting unit 51 shown in FIG. 5, constituents which have identical structure and functions to those of the light-emitting unit 11 shown in FIG. 1 are given respective identical reference numerals, and are not explained repeatedly. Moreover, how the light-emitting units 51 are arranged in tandem is identical to that of the light-emitting units 11, and is therefore not explained repeatedly.

In the light-emitting unit 51 shown in FIG. 5, a single white LED serving as a light source 55 is provided, at an edge of a light guide area 9, for a single light guide plate 7. Note that the light source 55 constituted by the white LED is disposed in a central area of a length L1, in the width direction D2, of the light guide plate 7. With the arrangement, it is possible to make a length X of the light guide area 9 smaller, as compared to a case where the light source 55 is disposed to be off-centered in the width direction D2 of the light guide plate 7.

The following description deals with how to set a lower limit of the length X of the light guide area 9.

In a case where the light source 55 is constituted by a single LED as above, it is only necessary that light entered from the light source 55 to the light guide plate 7 at a critical angle θ reach both ends, in the width direction D2, of the light guide plate 7 in the light guide area 9 in order to cause light entered from the light source 55 to the light guide plate 7 to reach whole of a boundary surface (interface) between the light-emitting area 10 and the light guide area 9.

The length X satisfying such a condition becomes minimum when light entered from the light source 55 to the light guide plate 7 at a critical angle θ reaches both ends, in the width direction D2, of the light guide plate 7 on a boundary surface between the light-emitting area 10 and the light guide area 9.

The minimum value of the length X satisfies the following equation (a-2).

$$\tan\theta = (L1/2)/X = L1/2X \quad \text{(a-2)}$$

The following equation (b) can be obtained from the Snell's law.

$$\sin\theta = 1/n \quad \text{(b)}$$

Moreover, the following equation (c) can be obtained from a formula of a trigonometric function.

$$\tan\theta = \frac{\sin\theta}{\sqrt{(1-\sin^2\theta)}} \quad \text{(c)}$$

The minimum value of the length X satisfies the following equation (d-2) which is obtained from equations (a-2) through (c).

$$L1/2X = \frac{1}{n\sqrt{\{1-(1/n^2)\}}} \quad \text{(d-2)}$$

$$X = \frac{L1 \times n\sqrt{\{1-(1/n^2)\}}}{2}$$

Therefore, the length X preferably satisfies the following expression (2).

$$X \geq \frac{L1 \times n\sqrt{\{1-(1/n^2)\}}}{2} \quad (2)$$

A preferable range of the length X of the light guide area 9 is thus specified by the expression (2) based on the fact that the light that entered from air, in which the light source 5 is provided, to the light guide plate 7 are refracted at an angle falling within a critical angle θ based on the Snell's law. Note that the critical angle θ varies depending on a refractive index n of a material of which the light guide plate 7 is made.

According to a backlight 2 constituted by a combination of the light-emitting units 51 arranged as above, it is possible to spread out light, which entered, at a critical angle, from each of the light sources to a corresponding one of light guide plates, to the whole of a boundary surface between a corresponding light-emitting section and a corresponding light guide section.

Note that an upper limit of the length X of a light guide area in the light-emitting unit 51 can be specified in a similar manner to the light-emitting unit 11. That is, the length X of the light guide area 9 and the length Y of the light-emitting area 10 satisfy the following expression (1), where Y is a length of the light-emitting area 10 in the length direction of the light-emitting area 10 in the light guide plate 7.

$$X<Y \quad (1)$$

This makes it possible to prevent three of a plurality of light guide plates arranged in tandem from being stacked, thereby preventing an increase in thickness of an illuminating device.

The present embodiment has dealt with an example in which a backlight includes a plurality of light-emitting units in each of which a single light guide plate is provided for a single light source (an LED group or an LED). However, in the present invention, the light guide plates need not to be separated for the respective light sources. Instead, the light guide plates can be formed so as to be integral with one another in the width direction D2.

In a case where light guide plates are formed so as to be integral with one another in the width direction as above, the object of the present invention can be attained by specifying a distance between adjacent LED groups and a length of a light guide area of each of the light guide plates. Specifically, the distance between the adjacent LED groups and the length of the light guide area are specified so that light emitted from each of the LED groups can spread out to both ends, in the width direction, of the light guide plate at least before the light reaches a light-emitting area (in the light guide area).

Further, the present embodiment has dealt with an example in which a light-emitting diode (LED) is used as a light source. However, the present invention is not limited to this arrangement, provided that the light source is a point light source.

As described above, an illuminating device of the present invention is arranged such that a length of the light guide section provided between the at least one point light source and the light-emitting section being set so that an area, on a boundary surface (interface) between the light-emitting section and the light guide section, of a cross-section of a light beam that is emitted from the at least one point light source and is diffused in the light guide plate is equal to or larger than an area of the boundary surface, and a following expression (1) being satisfied $$X<Y \quad (1)$$

where Y is a length of the light-emitting section in a length direction, and X is a length of the light guide section in the length direction, the length direction being a direction pointing from the at least one point light source toward the light-emitting section.

According to the arrangement, it is possible to prevent light emitted from a light source from reaching a light-emitting section before it is not sufficiently spread out. This can prevent unevenness in brightness which occurs due to the fact that there exist, in the light-emitting surface of the light guide plate, (i) bright parts where the light has reached and (ii) dark parts where the light did not reach. As such, it is possible to realize an illuminating device in which light from a light source can be more uniformly emitted.

Further, a liquid crystal display device of the present invention includes, as a backlight, any of the illuminating devices.

According to the arrangement, a liquid crystal display panel can be more uniformly irradiated by light. This allows an improvement in displaying quality.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

Industrial Applicability

According to the present invention, it is possible to provide an illuminating device in which light from a light source can be more uniformly emitted and an increase in thickness of the illuminating device can be suppressed. An illuminating device of the present invention can be used as a backlight of a liquid crystal display device.

The invention claimed is:

1. An illuminating device comprising:
a plurality of combinations each including: at least one point light source, and a light guide plate for causing light from the at least one point light source to be diffused and surface-emitted, the light guide plate including (i) a light-emitting section having a light-emitting surface and (ii) a light guide section for guiding the light from the at least one point light source to the light-emitting section, a light-emitting section of one of any adjacent two light guide plates in the plurality of combinations being provided above a light guide section of the other of the any adjacent two light guide plates in the plurality of combinations,
a following expression being satisfied

X<Y where Y is a length of the light-emitting section in a length direction, and X is a length of the light guide section in the length direction, the length direction being a direction pointing from the at least one point light source toward the light-emitting section,
a reflecting sheet being sandwiched between the light guide plate and a substrate having the light source, and
wherein a length of the light guide section provided between the at least one point light source and the light-emitting section being set so that an area, on a boundary surface between the light-emitting section and the light guide section, of a cross-section of a light beam that is emitted from the at least one point light source and is diffused in the light guide plate is equal to or larger than an area of the boundary surface.

2. An illuminating device comprising:
a plurality of combinations each including: at least one point light source, and a light guide plate for causing light from the at least one point light source to be diffused and surface-emitted, the light guide plate including (i) a light-emitting section having a light-emitting surface and (ii) a light guide section for guiding the light from the at least one point light source to the light-emitting section, a light-emitting section of one of any adjacent two light guide plates in the plurality of combinations being provided above a light guide section of the other of the any adjacent two light guide plates in the plurality of combinations,
a following expression being satisfied

X<Y where Y is a length of the light-emitting section in a length direction, and X is a length of the light guide section in the length direction, the length direction being a direction pointing from the at least one point light source toward the light-emitting section,
a reflecting sheet being sandwiched between the light guide plate and a substrate having the light source, and
wherein in a case where the single point light source is provided in a central area of a length L1 of the light guide plate, the length X in the length direction of the light guide section which is provided between the single point light source and the light-emitting section satisfies a following expression $$X \geqq \frac{L1 \times n\sqrt{\{1-(1/n^2)\}}}{2}$$

where n is a refractive index of the light guide plate, and L1 is a length in a width direction of the light guide plate, the width direction intersecting with the length direction.

3. The illuminating device according to claim 2, wherein: the refractive index n is 1.49.

4. An illuminating device comprising:
a plurality of combinations each including: at least one point light source, and a light guide plate for causing light from the at least one point light source to be diffused and surface-emitted, the light guide plate including (i) a light-emitting section having a light-emitting surface and (ii) a light guide section for guiding the light from the at least one point light source to the light-emitting section, a light-emitting section of one of any adjacent two light guide plates in the plurality of combinations being provided above a light guide section of the other of the any adjacent two light guide plates in the plurality of combinations,
a following expression being satisfied

X<Y where Y is a length of the light-emitting section in a length direction, and X is a length of the light guide section in the length direction, the length direction being a direction pointing from the at least one point light source toward the light-emitting section,
a reflecting sheet being sandwiched between the light guide plate and a substrate having the light source, and wherein the plurality of combinations each of which includes a plurality of point light sources which are disposed in a width direction intersecting with the length direction, and in a case where the plurality of point light sources are provided in a central area of a length L1 of the light guide plate, the length X in the length direction of the light guide section provided between the plurality of point light sources and the light-emitting section satisfies a following expression $$X \geqq \frac{(L1 + L2)n\sqrt{\{1 - (1/n^2)\}}}{2}$$

where n is a refractive index of the light guide plate, L2 is a distance between a point light source at one end and a point light source at the other end in an arrangement direction of the plurality of point light sources, and L1 is a length in the width direction of the light guide plate.

5. The illuminating device according to claim 4, wherein the refractive index n is 1.49.

* * * * *